United States Patent
Pan et al.

(10) Patent No.: US 10,942,067 B2
(45) Date of Patent: *Mar. 9, 2021

(54) METHOD AND APPARATUS FOR SURFACE AND AMBIENT TEMPERATURE ESTIMATION FOR PORTABLE DEVICES

(71) Applicant: MediaTek Inc., Hsinchu (TW)

(72) Inventors: Chi-Wen Pan, Taipei (TW); Pei-Yu Huang, Hsinchu (TW); Sheng-Liang Kuo, Zhubei (TW); Jih-Ming Hsu, Taoyuan (TW); Tai-Yu Chen, Taipei (TW); Yun-Ching Li, Taoyuan (TW); Wei-Ting Wang, Taipei (TW)

(73) Assignee: MediaTek Inc., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/920,583

(22) Filed: Jul. 3, 2020

(65) Prior Publication Data
US 2020/0333193 A1    Oct. 22, 2020

Related U.S. Application Data

(63) Continuation of application No. 15/859,518, filed on Dec. 30, 2017, now Pat. No. 10,739,206.
(Continued)

(51) Int. Cl.
*G01K 1/00*       (2006.01)
*G01K 7/00*       (2006.01)
(Continued)

(52) U.S. Cl.
CPC ............. *G01K 1/20* (2013.01); *G01K 7/16* (2013.01); *G01K 7/42* (2013.01); *G01K 7/427* (2013.01);
(Continued)

(58) Field of Classification Search
USPC ............ 374/100, 163, 208, 141, 134
See application file for complete search history.

(56) References Cited

U.S. PATENT DOCUMENTS 6,630,754 B1   10/2003   Pippin
9,521,246 B2   12/2016   Hsu et al.
(Continued)

FOREIGN PATENT DOCUMENTS

CN    104776938 B    7/2015

OTHER PUBLICATIONS

Pfost et al, "Compact Nonlinear Thermal Networks for Accurate Modeling of Smart Power ICs," Signals, Circuits and Systems (ISSCS), 2011 10th International Symposium on, IEEE, Jun. 30, 2011, pp. 1-4.
(Continued)

*Primary Examiner* — Mirellys Jagan
(74) *Attorney, Agent, or Firm* — Tong J. Lee (57) ABSTRACT

The surface temperature of a portable device is estimated. The portable device includes a sensor for detecting the internal temperature of the portable device. The portable device also includes circuitry for estimating the surface temperature, using the internal temperature and an ambient temperature of the portable device as input to a circuit model. The circuit model describes thermal behaviors of the portable device. The circuitry is operative to identify a scenario in which the portable device operates, and determine the ambient temperature using the scenario and at least the internal temperature.

20 Claims, 7 Drawing Sheets

Related U.S. Application Data (60) Provisional application No. 62/463,005, filed on Feb. 24, 2017.

(51) Int. Cl.
    *G01K 1/20*     (2006.01)
    *G06F 1/20*     (2006.01)
    *G01K 7/42*     (2006.01)
    *G01K 7/16*     (2006.01)
    *G01K 13/00*     (2021.01)

(52) U.S. Cl.
    CPC .............. *G01K 13/00* (2013.01); *G06F 1/206* (2013.01); *G06F 1/20* (2013.01)

(56) References Cited

U.S. PATENT DOCUMENTS

| | | |
|---|---|---|
| 9,557,228 B1 | 1/2017 | Parvarandeh |
| 2006/0221568 A1 | 10/2006 | Kardach et al. |
| 2008/0028778 A1 | 2/2008 | Millet |
| 2008/0112463 A1 | 5/2008 | Rotem et al. |
| 2011/0119018 A1 | 5/2011 | Skarp |
| 2013/0090888 A1 | 4/2013 | Anderson et al. |
| 2014/0163765 A1 | 6/2014 | Jain et al. |
| 2014/0355649 A1 | 12/2014 | Niederberger et al. |
| 2015/0088333 A1 | 3/2015 | Delano et al. |
| 2015/0229155 A1 | 8/2015 | Sporck et al. |
| 2015/0292959 A1 | 10/2015 | Graf et al. |
| 2016/0069753 A1 | 3/2016 | Phan Le |
| 2016/0187272 A1 | 6/2016 | Masatoshi |
| 2018/0136051 A1* | 5/2018 | Ishii .................... G01K 1/20 |

OTHER PUBLICATIONS

Davidson et al, "Required Cauer Network Order for Modelling of Thermal Transfer Impedance," Electronics Letters, Feb. 13, 2014, vol. 50, No. 4, pp. 260-262.

\* cited by examiner

FIG. 7

METHOD AND APPARATUS FOR SURFACE AND AMBIENT TEMPERATURE ESTIMATION FOR PORTABLE DEVICES

CROSS-REFERENCE TO RELATED APPLICATIONS

This application is a continuation application of U.S. patent application Ser. No. 15/859,518 filed on Dec. 30, 2017, and claims the benefit of U.S. Provisional Application No. 62/463,005 filed on Feb. 24, 2017, the entirety of which is incorporated by reference herein.

TECHNICAL FIELD

Embodiments of the invention relate to thermal management of portable devices.

BACKGROUND

Modern portable devices, such as laptops, tablets, smartphones, smart watches, gaming devices and other consumer electronics, are designed to run system and user space applications when the devices are held by or in contact with users. Thermal management for these devices regulates not only the internal temperature of the device to ensure safe operation, but also the surface temperature of the device such that it is comfortable for the user to touch the device. Thermal management prevents the device from generating excessive heat, as excess temperature can degrade the performance, life, and reliability of the device. One form of dynamic thermal management is thermal throttling. Thermal throttling reduces the processor performance when the processors in the device are heavily loaded, to thereby limit the internal temperature and the surface temperature to acceptable levels.

One approach to estimating the surface temperature of a portable device is to use the internal temperature minus a fixed offset to calculate the surface temperature. However, the difference (i.e., offset) between the internal temperature and the surface temperature can vary from one device product to another, and can vary in the same device under different usage scenarios and different levels of power consumption. Using such an oversimplified approach often leads to inaccurate estimation of the surface temperature, and may cause performance to be throttled before the surface temperature reaches a predetermined limit.

Another approach to estimating the surface temperature of a portable device is to place a temperature sensor at the device surface; e.g., the display. However, such a sensor detects the temperature of a limited surface area on the device. In some usage scenarios there may be multiple heat sources located in different parts of the device, causing non-uniform temperature rise on the device surface. Furthermore, in different usage scenarios there may be different heat sources inside the device, causing the surface temperature to rise on different parts of the device surface. Thus, a temperature sensor at a fixed surface location may be unable to detect surface temperature change across these usage scenarios.

Thus, there is a need for improvement in surface temperature determination to thereby enable accurate dynamic thermal management of a portable device.

SUMMARY

In one embodiment, a method is provided for estimating a surface temperature of a portable device. The method comprises detecting an internal temperature of the portable device; identifying a scenario in which the portable device operates; determining an ambient temperature of the portable device using the scenario and at least the internal temperature; an estimating the surface temperature using the internal temperature and the ambient temperature as input to a circuit model that describes thermal behaviors of the portable device.

In another embodiment, a portable device is provided to estimate a surface temperature of the portable device. The portable device comprises a sensor to detect an internal temperature of the portable device. The portable device further comprises circuitry to estimate the surface temperature, using the internal temperature and an ambient temperature of the portable device as input to a circuit model that describes thermal behaviors of the portable device. The circuitry is further operative to identify a scenario in which the portable device operates; and determine the ambient temperature using the scenario and at least the internal temperature.

The embodiments of the invention enable a portable device to estimate its surface temperature without the use of a surface temperature sensor. Estimation of the surface temperature allows the portable device to improve its dynamic thermal management such that thermal throttling may be performed when the surface temperature reaches a predetermined limit. Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The surface temperature of a portable device is estimated according to embodiments of the invention. The surface temperature, also referred to as the skin temperature, is estimated based on the ambient temperature and the internal temperature of the device. The estimation of the surface temperature may be performed using a circuit model that describes thermal behaviors of the device with a plurality of thermal capacitors and thermal resistors. The use of the circuit model enables the estimation to be made with high accuracy, thus minimizing un-utilized thermal headroom of the device and premature thermal throttling. In one embodiment, the ambient temperature may be estimated based on the internal temperature or a time-series of internal temperatures (i.e., successive internal temperatures detected over a time period) of the device. The ambient temperature is the temperature of the environment in which the device operates. According to embodiments to be described herein, the ambient temperature may be estimated without temperature sensors embedded in or directly attached to the device surface.

Figure 1:
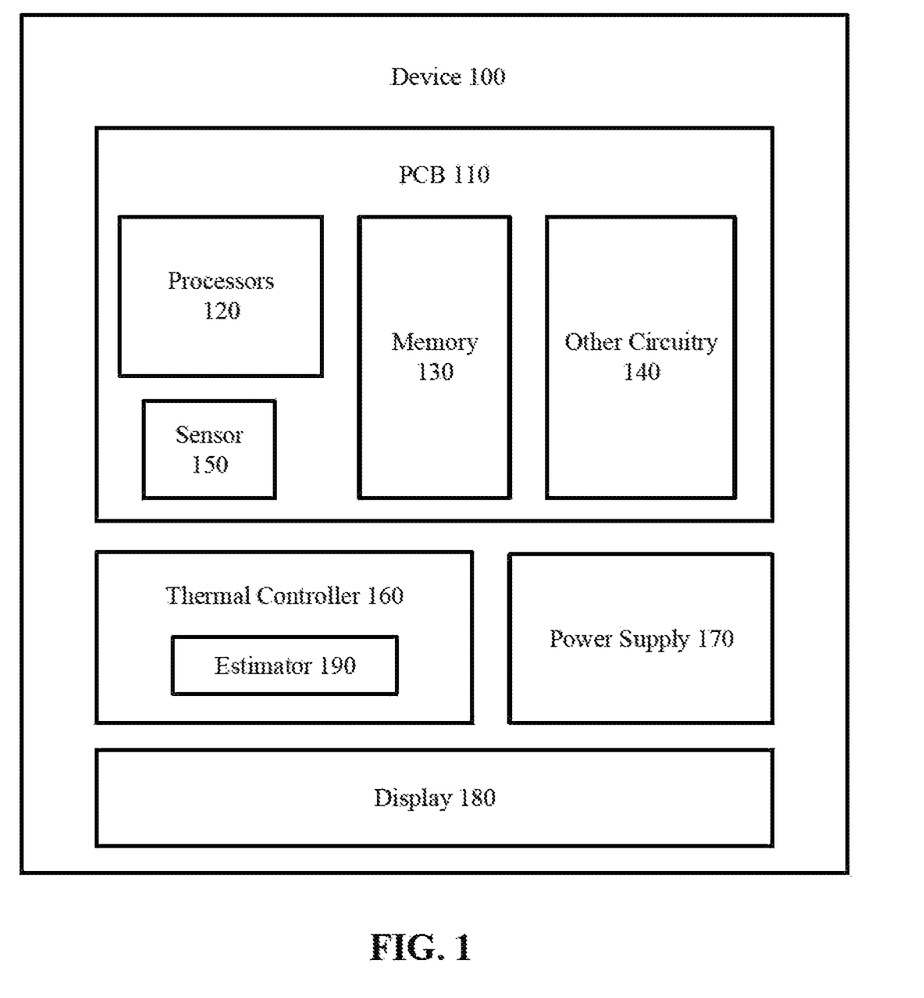
FIG. 1 illustrates an example of a device performing surface temperature estimation according to one embodiment.

FIG. 1 illustrates a simplified diagram of a portable device ("device 100") according to one embodiment. The device 100 includes a printed circuit board (PCB) 110, which further includes one or more processors 120 (e.g., central processing units (CPUs), graphic processing units (GPUs), digital signal processors (DSPs), and/or other types of special/general-purpose processors or processing circuitry), one or more memory devices 130 (e.g., volatile memory such as random access memory (RAM), and/or non-volatile memory such as read-only memory (ROM), flash memory, etc.), and other circuitry 140 such as memory controller, network adapter, clock circuitry, voltage regulator, etc. Additional components of the device 100 are not shown to simplify the description.

Figure 2:
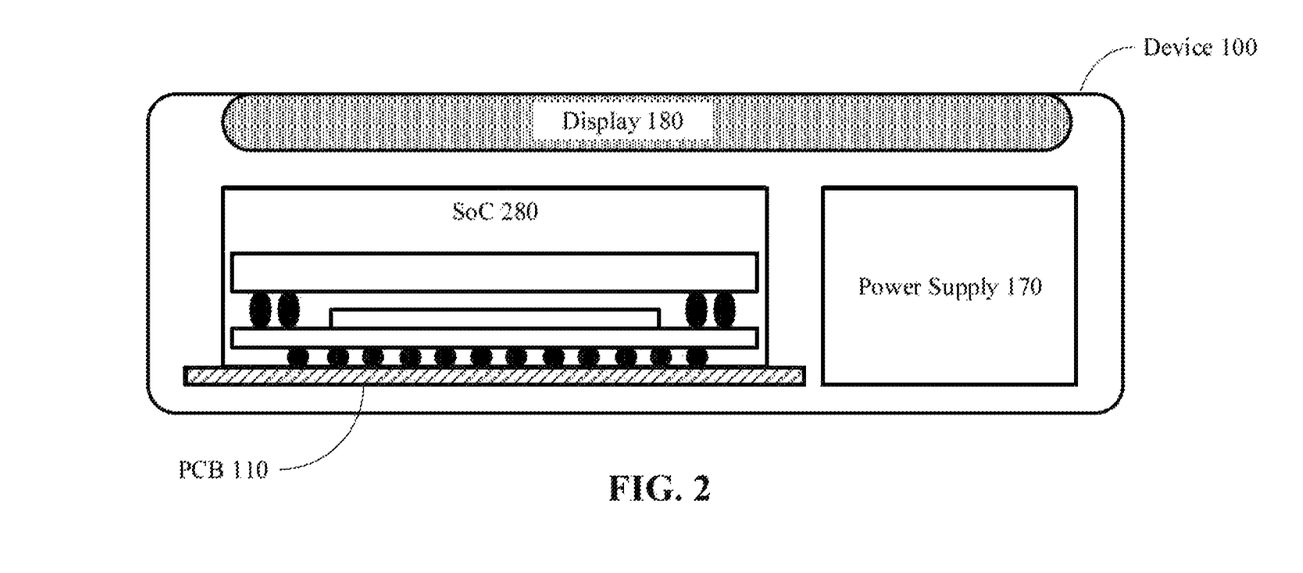
FIG. 2 illustrates a side view of a device that includes a sensor for detecting the internal temperature according to one embodiment

Before proceeding with the description of FIG. 1, a side view of the device 100 is shown according to one embodiment in FIG. 2. In the side view shown in FIG. 2, the device 100 includes the PCB 110, which further includes a system-on-a-chip (SoC) 280. In one embodiment, some or all of the processors 120 and the memory devices 130, as well as some components of the other circuitry 140 may reside in the SoC 280. FIG. 1 shows that a sensor 150 is mounted on the PCB 110 to sense or detect the internal temperature of the device 100; e.g., the temperature of the PCB 110. In an alternative embodiment, the sensor 150 may be attached to the SoC 280 (shown in FIG. 2), the processors 120 (shown in FIG. 1), or other circuit components. That is, the internal temperature may be the PCB 110 temperature, the SOC 280 temperature, or the temperature of any circuit component to which the sensor 150 is attached. In one embodiment, the device 100 may include more than one sensors 150 for detecting the internal temperature.

Non-limiting examples of the device 100 may include: a cellphone, a smart watch, e-reader, or any handheld or wearable electronic device whose surface is in contact with the user's skin when in use.

Referring again to FIG. 1, the device 100 also includes a thermal controller 160, which performs dynamic thermal management on the device 100 based on at least the estimation of the surface temperature. Although the thermal controller 160 is shown as a component outside the PCB 110, in alternative embodiments the thermal controller 160 may be implemented on the PCB 110, or as part of an operating system (OS) stored in the memory 130 and containing an interface to hardware, to control the voltage supply and/or clock circuitry to thereby dynamically adjust the voltage and/or frequency of the processors 120. Adjusting the processor voltage and/or frequency at runtime, in effect, adjusts the processors' power consumption and heat output. Referring to FIG. 1 and FIG. 2, in one embodiment, the device 100 may further include a power supply 170 (e.g., battery), a display 180, and other hardware components.

The thermal controller 160 may include or be coupled to a temperature estimator, an embodiment of which is shown in FIG. 1 as an estimator 190. The estimator 190 estimates the surface temperature of the device 100 using the internal temperature and the ambient temperature as input to a circuit model, where the circuit model characterizes thermal behaviors of the device 100. The parameters used in the circuit model may vary across different device product lines, and may be identified or chosen by the manufacturer of the device 100 based on results of simulations or experiments. The parameters are chosen such that the estimated surface temperature approximates the temperature of the warmest part of the device surface, where the warmest part may be the display, the back cover, the side surface, etc., depending on the applications being executed and the hardware being utilized. Based on the estimator's result, the thermal controller 160 may determine whether or not to throttle the performance of the processors 120.

Figure 3A:
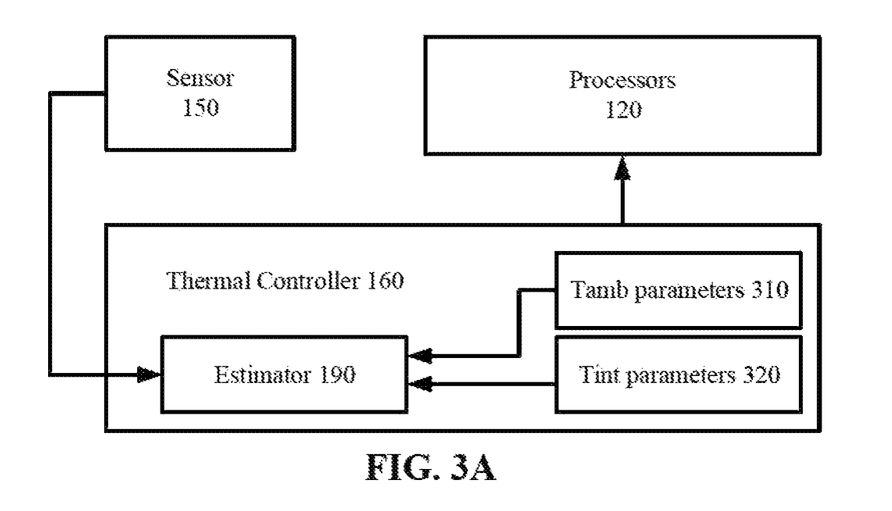
FIG. 3A and FIG. 3B illustrate temperature estimators according to two alternative embodiments.
Figure 3B:
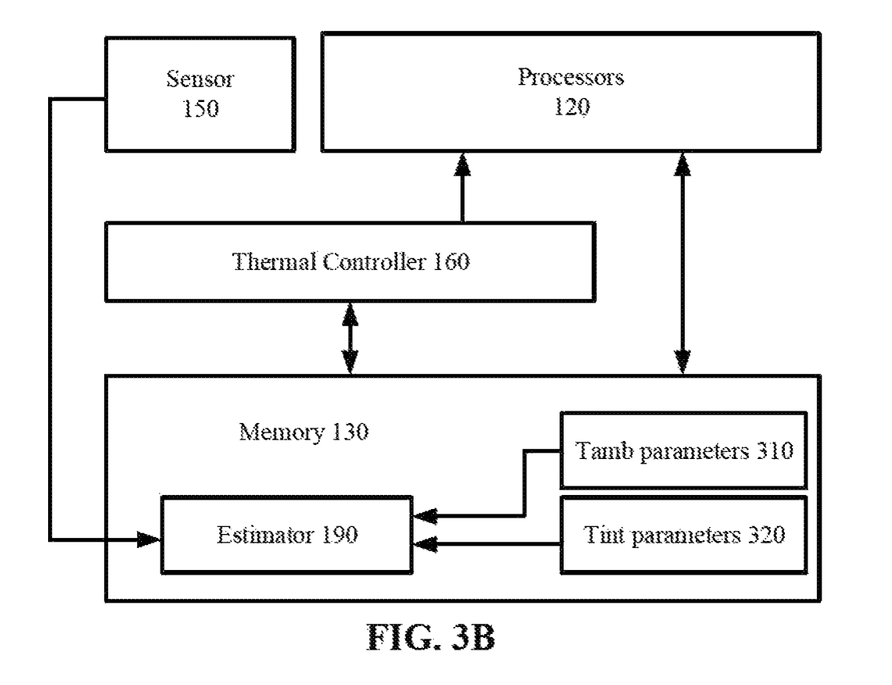

FIG. 3A and FIG. 3B illustrates the estimator 190 according to two alternative embodiments. The estimator 190 may be implemented by hardware (e.g., general-purpose processors or Application-Specific Integrated Circuit (ASIC)), software (containing instructions stored in the memory 130 and executable by the processors 120) or a combination of both. In FIG. 3A, the estimator 190 is a hardware component within or coupled to the thermal controller 160. The estimator 190 receives the sensor 150 measurements of the internal temperature, and uses ambient temperature (Tamb) parameters 310 and internal temperature (Tint) parameters 320 to calculate an estimated surface temperature of the device 100. The result of the estimation is used by the thermal controller 160 to control the operation of the processors 120.

In FIG. 3B, the estimator 190 is a software program stored in the memory 130. The processors 120 executes the instructions of the estimator 190 software program, using the sensor 150 measurements, Tamb parameters 310 and Tint parameters 320 as input to estimate the surface temperature. The estimation performed by or according to the estimator 190 is described below in connection with FIG. 4A and FIG. 4B.

Figure 4A:
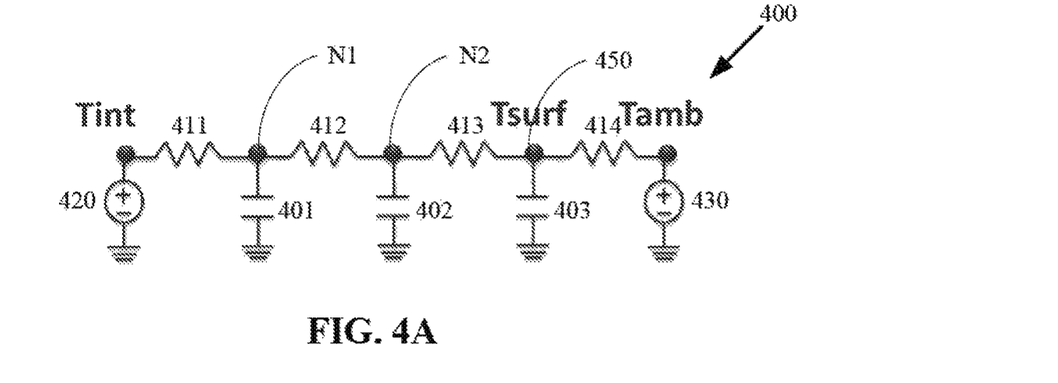
FIG. 4A, FIG. 4B and FIG. 4C illustrate circuit models for estimating the surface temperature of a device according to alternative embodiments.
Figure 4B:
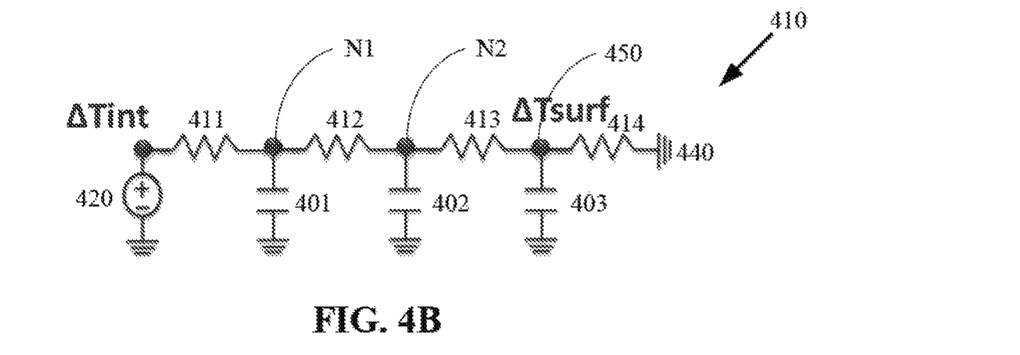

FIG. 4A and FIG. 4B illustrate thermal-equivalent circuit diagrams for estimating the surface temperature according to some embodiments. Each of these thermal-equivalent circuit diagrams shows a circuit model, which is an electric analog circuit describing the thermal behaviors of the device 100; e.g., heat conduction.

FIG. 4A shows a circuit model 400 including laddered RC circuit components, where the RC circuit components include thermal capacitors (401, 402, 403) and thermal resistors (411, 412, 413, 414). These thermal capacitors and thermal resistors are the thermal equivalents of their electrical counterparts. The circuit model 400 is an electrical description of a thermal system, and it obeys the Kirchhoff's circuit laws. The internal temperature (Tint) and the ambient temperature (Tamb) may be modeled as voltage sources 420 and 430, respectively. The surface temperature (Tsurf) may be modeled as an internal point 450 in the circuit model 400. The thermal capacitors (401, 402, 403) and the thermal resistors (411, 412, 413, 414) model or describe the thermal behaviors of the device 100, and are collectively referred to as the Tint parameters 320. In alternative embodiments, the numbers of thermal capacitors and thermal resistors, and/or the number of ladders in the circuit model 400, may be different from the examples shown herein. In the circuit model 400, the temperatures at internal points N1, N2 and Tsurf may be represented by the respective voltages at these points. The circuit model 400 can be used to calculate an estimated Tsurf, using Tint and Tamb as input, where Tint is measured by the sensor 150 of FIG. 1. In one embodiment, Tamb may be a constant value, invariant of time and device surroundings. Alternatively, Tamb may slowly change over time (i.e., time-varying). A method of estimating Tamb will be described with reference to FIG. 5. The circuit model 400 describes the temperature gradient from Tint to Tamb, in the direction of lower temperature (i.e., from hot to cold).

FIG. 4B shows a circuit model 410 which includes the same thermal capacitors (401, 402, 403) and thermal resistors (411, 412, 413, 414) as in the circuit model 400, but the voltage source 430 representing Tamb is replaced by a ground terminal 440. The circuit model 410 can be used when Tamb is a known constant value. The delta internal temperature (ΔTint) is the internal temperature value detected by the sensor 150 minus Tamb (i.e., ΔTint=Tint−Tamb); in the circuit model 410, ΔTint is modeled as a voltage output at the voltage source 420. The delta surface temperature (ΔTsurf) corresponding to ΔTint can be calculated using ΔTint and the Tint parameters 320 as input. More specifically, ΔTsurf is a temperature difference caused by heat transfer from the device interior to the device surface. For example, the following three equations may be formulated according to the Kirchhoff's circuit laws applied on the circuit model 410. The three unknown values (temperatures at N1, N2 and ΔTsurf at point 450, all of which are represented by voltages) can be solved from the following three equations.

$$\frac{V_{N1} - \Delta T_{int}}{R_{411}} + \frac{V_{N1} - V_{N2}}{R_{412}} + C_{401}\frac{dV_{N1}}{dt} = 0$$

$$\frac{V_{N2} - V_{N1}}{R_{412}} + \frac{V_{N2} - \Delta T_{surf}}{R_{413}} + C_{402}\frac{dV_{N2}}{dt} = 0$$

$$\frac{\Delta T_{surf} - V_{N2}}{R_{413}} + \frac{\Delta T_{surf}}{R_{414}} + C_{403}\frac{d(\Delta T_{surf})}{dt} = 0$$

After ΔTsurf is solved, Tsurf can be calculated by: Tsurf=ΔTsurf+Tamb.

Figure 4C:
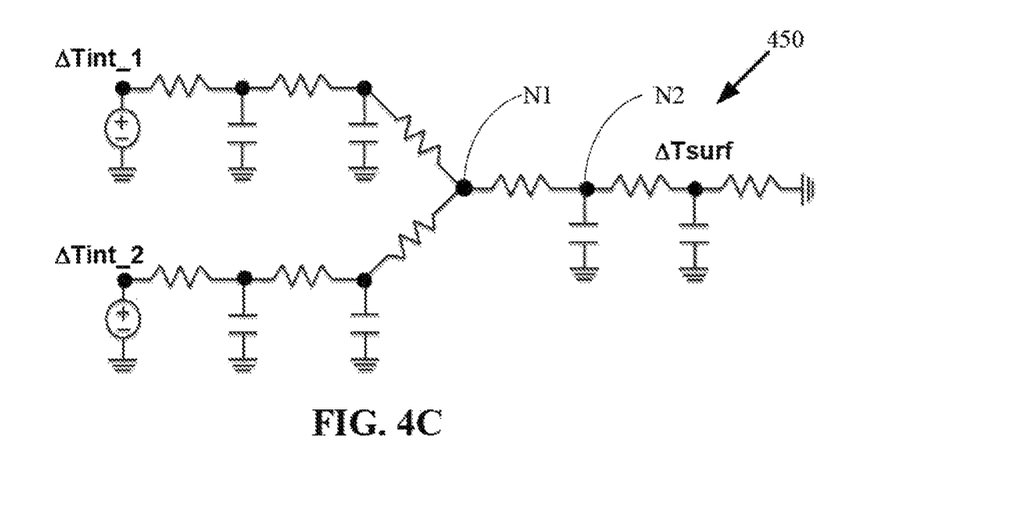

FIG. 4C shows a circuit model 450 which includes two branches extending from point N1, each branch with a voltage source representing a respective internal temperature detected by a respective sensor. More specifically, in this example two sensors are used to sense the internal temperatures of the device. In alternative embodiments, more than two sensors may also be used. The surface temperature may be calculated by solving a set of equations formulated according to the Kirchhoff's circuit laws.

Figure 5:
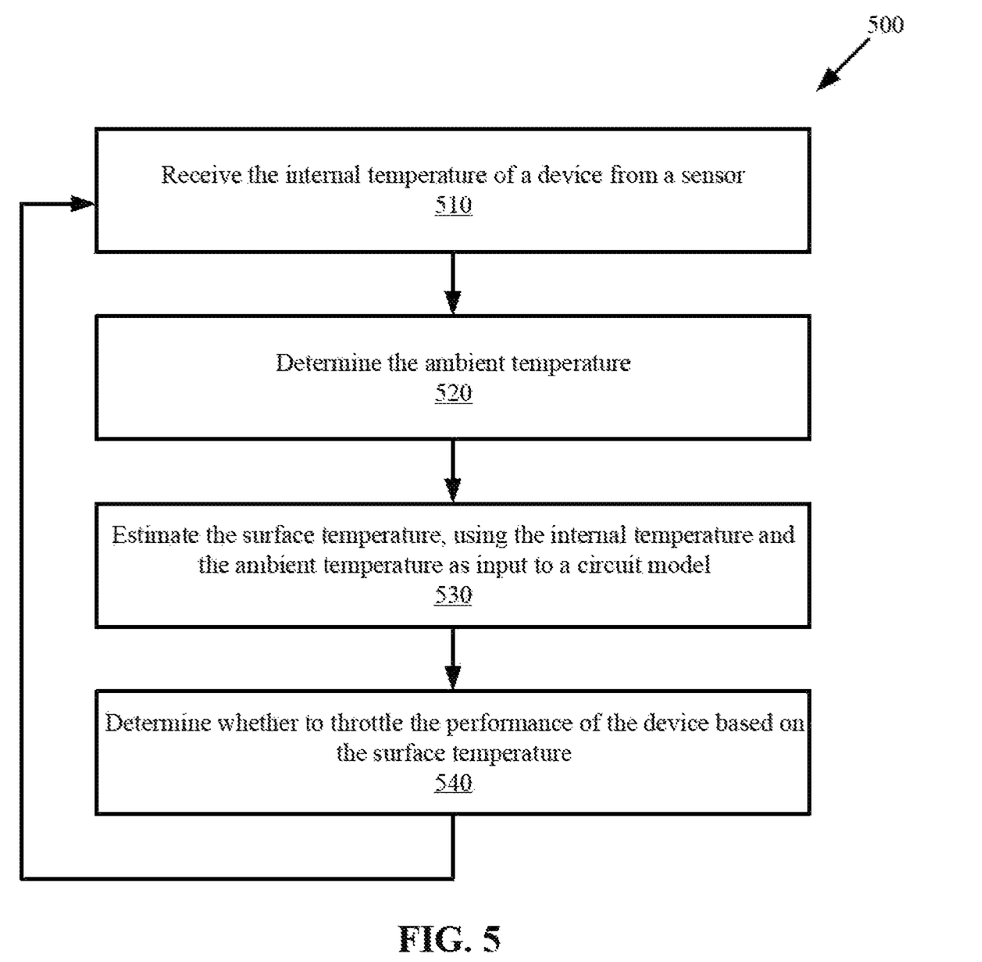
FIG. 5 is a flow diagram illustrating a thermal management method according to one embodiment.

FIG. 5 is a flow diagram illustrating a method 500 of performing thermal management based on the surface temperature of a portable device (e.g., the device 100 of FIG. 1) according to one embodiment. The method 500 may be performed by the device 100. The steps 510-540 may be repeated at a fixed time interval.

Referring also to FIG. 1, the method 500 begins with the estimator 190 receiving the internal temperature of the device detected by the sensor 150 (step 510). The estimator 190 determines the ambient temperature (step 520). In one embodiment, a constant value may be used as the ambient temperature. In another embodiment, the ambient temperature is determined based on the state of the device 100, to be described with reference to FIG. 6. The surface temperature is then calculated using the internal temperature and the ambient temperature as input to a circuit model (step 530). The surface temperature may be used by the thermal controller 160 to determine whether to throttle the performance of the device 100; e.g., by reducing the frequency of the processors 120.

The ambient temperature may be estimated from a time-series of internal temperatures; that is, the current internal temperature and the successive past internal temperatures. Experiments have shown that the internal temperature and its changes over time are correlated to the ambient temperature when the device 100 is in the idle state (e.g., when the processors 120 are not in active operation). When the device 100 is not idle (e.g., when at least one processor 120 is in the operating state), the internal temperature may fluctuate rapidly with processor usage, and therefore it may be difficult to discern a correlation between the internal temperature and the ambient temperature. Thus, in one embodiment, the ambient temperature is not updated when the device 100 is in operation (i.e., not idle).

Figure 6A:
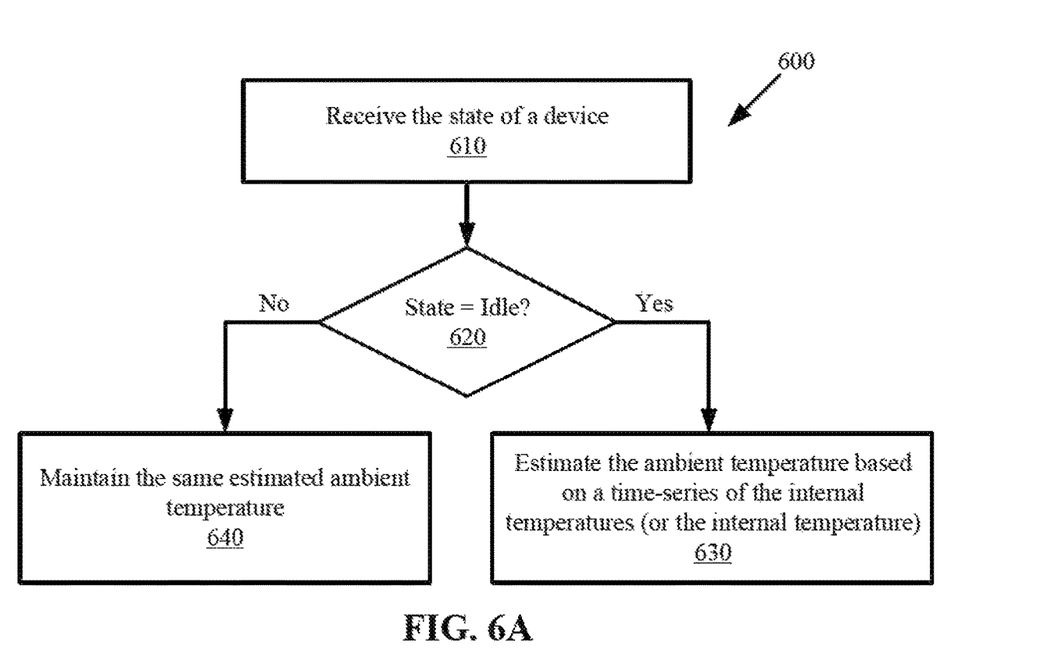
FIG. 6A, FIG. 6B and FIG. 6C are flow diagrams illustrating methods for estimating the ambient temperature according to alternative embodiments.
Figure 6B:
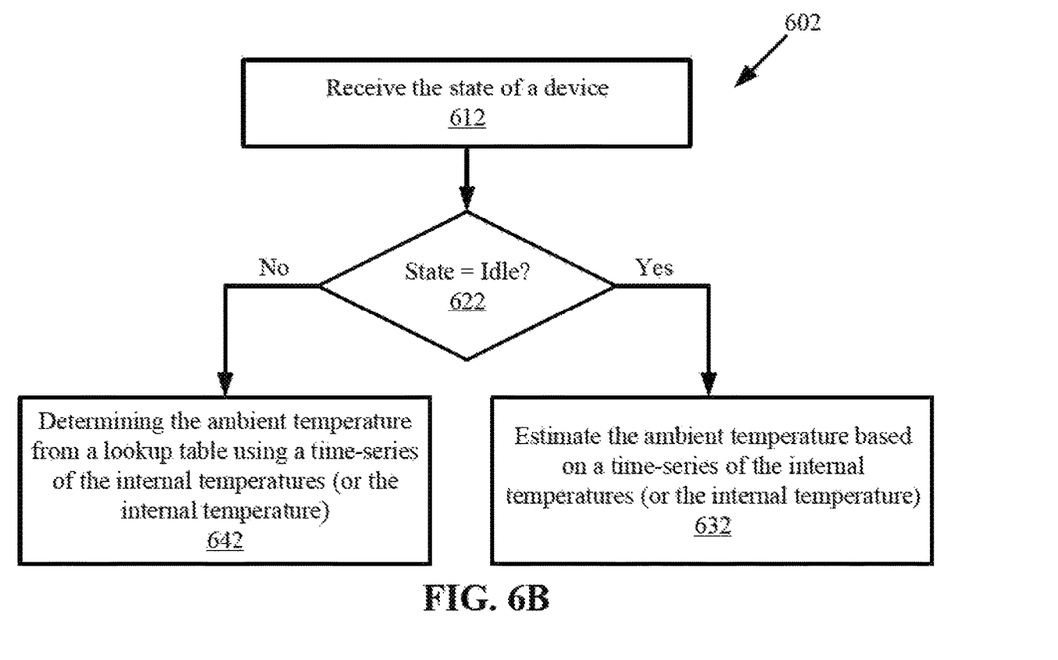

FIG. 6A is a flow diagram illustrating a method 600 for determining the ambient temperature according to one embodiment. FIG. 6B is a flow diagram illustrating a method 602 for determining the ambient temperature according to another embodiment The methods 600 and 602 include further details of the step 520 of FIG. 5 at which the ambient temperature is determined based on the state of the device 100. The methods 600 and 602 may be performed by the device 100 of FIG. 1. Although the methods 600 and 602 are described by referring to the internal temperature sensed at one internal location of the device 100, it is understood that the methods 600 and 602 apply to internal temperatures sensed at multiple locations of the device 100.

Referring also to FIG. 1, the method 600 begins with the estimator 190 receiving (or obtaining) a state of the device 100 (e.g., the state of the processors 120) (step 610). If the state is idle (step 620), the ambient temperature may be estimated using a time-series of internal temperatures as input to an ambient temperature model (step 630). The ambient temperature model may be constructed prior to runtime of the device 100 based on calibrations of ambient temperatures vs. internal temperatures, and may be stored in or accessed by the device 100. In one embodiment, the ambient temperature model records the correlation between the ambient temperature and the internal temperatures over time. The estimation may be made by using the currently-detected internal temperature and the successive past internal temperatures to determine the correlated ambient temperature. In one embodiment, the internal temperatures detected over time is a time-series of internal temperatures which may be approximated by fitting an N-order polynomial to the time-series with N being any positive integer. In an alternative embodiment, the ambient temperature model records the correlation between the ambient temperature and a corresponding internal temperature, and the estimation may be made by using the currently-detected internal temperature to determine the correlated ambient temperature. If the state is not idle (step 620), the ambient temperature is not updated; that is, the same ambient temperature as in the previous time instant is maintained (step 640). Thus, if the device 100 transitions from the idle state to the operating state, the ambient temperature may be maintained at the same value as the most-recently estimated value in the idle state.

In FIG. 6B, the method 602 begins with the estimator 190 receiving (or obtaining) a state of the device 100 (e.g., the state of the processors 120) (step 612). If the state is idle (step 622), the ambient temperature may be estimated using a time-series of internal temperatures as input to an ambient temperature model (step 632). The ambient temperature model has been described above with reference to FIG. 6B. If the state is not idle (step 622), the ambient temperature may be looked up from a table using the currently-detected internal temperature, or a time-series of internal temperatures (step 642). As mentioned before, the time-series of internal temperatures may be approximated by fitting an N-order polynomial to the time-series with N being any positive integer.

Figure 6C:
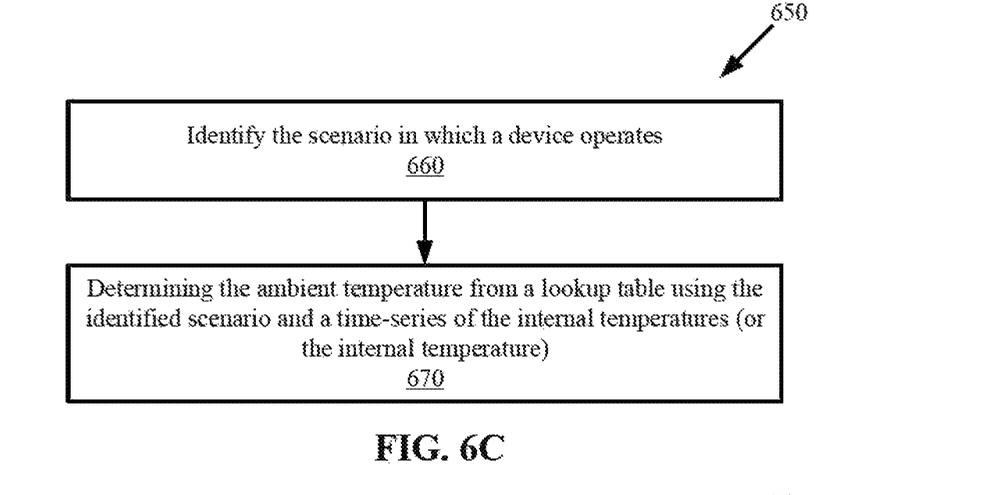

FIG. 6C is a flow diagram illustrating a method 650 for determining the ambient temperature according to another embodiment. The method 650 includes further details of the step 520 of FIG. 5 at which the ambient temperature is determined based on the state of the device 100, and provides an alternative to the steps 630 and 640 of FIG. 6A, as well as the steps 632 and 642 of FIG. 6B. The method 650 may be performed by the device 100 of FIG. 1. Although the method 650 is described by referring to the internal temperature sensed at one internal location of the device 100, it is understood that the method 650 applies to internal temperatures sensed at multiple locations of the device 100.

Referring also to FIG. 1, the method 650 begins with the estimator 190 identifying a scenario in which the device 100 operates (e.g., the application runs on the processors 120) (step 660). The device 100 may store or access a lookup table, which associates internal temperatures with corresponding ambient temperatures based on calibrations performed prior to runtime of the device 100 for each of a set of scenarios in which the device 100 may operate. In one embodiment, one of the scenarios may be the idle state (i.e., no active operation). Once the scenario is identified, the ambient temperature may be looked up from a table using the currently-detected internal temperature, or a time-series of internal temperatures (step 670). As mentioned before, the time-series of internal temperatures may be approximated by fitting an N-order polynomial to the time-series with N being any positive integer.

Figure 7:
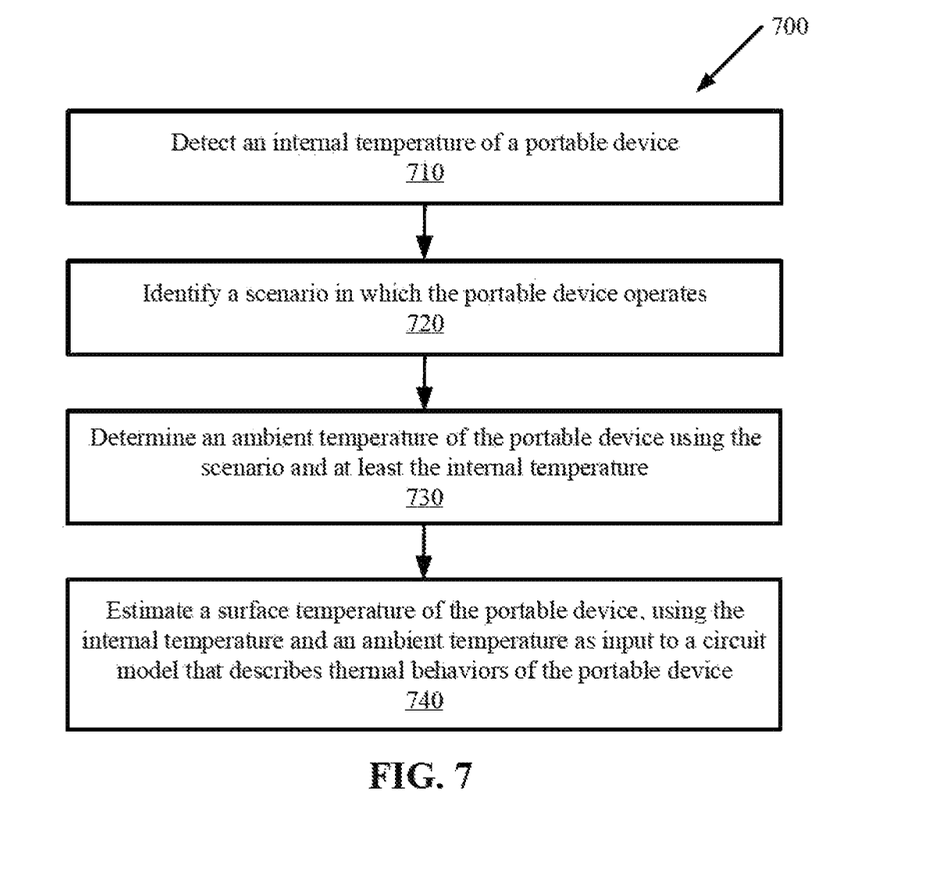
FIG. 7 is a flow diagram illustrating a method for estimating the surface temperature of a portable device according to one embodiment.

FIG. 7 is a flow diagram illustrating a method 700 of estimating surface temperature of a portable device (e.g., the device 100 of FIG. 1) according to one embodiment. The method 700 begins with a sensor detecting an internal temperature of a portable device (step 710). A scenario in which the portable device operates is identified (step 720). An ambient temperature of the portable device is determined using the scenario and at least the internal temperature (step 730). A surface temperature of the portable device is estimated using the internal temperature and the ambient temperature as input to a circuit model that describes thermal behaviors of the portable device (step 740).

The operations of the flow diagrams of FIGS. 5-7 have been described with reference to the exemplary embodiment of FIG. 1. However, it should be understood that the operations of the flow diagrams of FIGS. 5-7 can be performed by embodiments of the invention other than the embodiment discussed with reference to FIG. 1, and the embodiment discussed with reference to FIG. 1 can perform operations different than those discussed with reference to the flow diagrams. While the flow diagrams of FIGS. 5-7 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for estimating a surface temperature of a portable device, comprising:
   detecting an internal temperature of the portable device;
   identifying a scenario in which the portable device operates;
   determining an ambient temperature of the portable device using the scenario and at least the internal temperature; and
   estimating the surface temperature using the internal temperature and the ambient temperature as input to a circuit model that describes thermal behaviors of the portable device.

2. The method of claim 1, wherein detecting the internal temperature further comprises:
   sensing a temperature of at least one hardware component inside the portable device.

3. The method of claim 1, further comprising:
   determining whether the portable device is in an idle state before determining the ambient temperature.

4. The method of claim 3, wherein determining the ambient temperature further comprises:
   estimating the ambient temperature from a time-series of internal temperatures when the portable device is in the idle state.

5. The method of claim 3, further comprising:
   maintaining the ambient temperature at a same value as a most-recently estimated value of the ambient temperature in the idle state for use in the circuit model when the portable device is in an operating state.

6. The method of claim 1, wherein the circuit model includes a plurality of thermal capacitors, a plurality of thermal resistors, a first voltage source representing the internal temperature, and a node representing the surface temperature.

7. The method of claim 6, further comprising:
   detecting one or more additional internal temperatures of the portable device, wherein in the circuit model the one or more additional internal temperatures are represented by one or more additional voltage sources located in different branches of a laddered RC circuit.

8. The method of claim 7, wherein the circuit model further includes a second voltage source representing the ambient temperature.

9. The method of claim 7, wherein the circuit model further includes a ground terminal representing the ambient temperature at a fixed value.

10. The method of claim 7, wherein the surface temperature (Tsurf) is equal to Tsurf=ΔTsurf+Tamb, where Tamb is the ambient temperature and ΔTsurf is a temperature difference caused by heat transfer from an interior to a surface of the portable device.

11. A portable device operative to estimate a surface temperature of the portable device, comprising:
a sensor to detect an internal temperature of the portable device; and
circuitry to estimate the surface temperature using the internal temperature and an ambient temperature of the portable device as input to a circuit model that describes thermal behaviors of the portable device, wherein the circuitry is further operative to:
identify a scenario in which the portable device operates; and
determine the ambient temperature using the scenario and at least the internal temperature.

12. The portable device of claim 11, wherein the sensor is operative to sense a temperature of at least one hardware component inside the portable device.

13. The portable device of claim 11, wherein the circuitry is further operative to determine whether the portable device is in an idle state before determining the ambient temperature.

14. The portable device of claim 13, wherein the circuitry is further operative to estimate the ambient temperature from a time-series of internal temperatures when the portable device is in the idle state.

15. The portable device of claim 13, wherein the circuitry is further operative to maintain the ambient temperature at a same value as a most-recently estimated value of the ambient temperature in the idle state for use in the circuit model when the portable device is in an operating state.

16. The portable device of claim 11, wherein the circuit model includes a plurality of thermal capacitors, a plurality of thermal resistors, a first voltage source representing the internal temperature, and a node representing the surface temperature.

17. The portable device of claim 16, wherein the sensor is operative to sense one or more additional internal temperatures of the portable device, wherein in the circuit model the one or more additional internal temperatures are represented by one or more additional voltage sources located in different branches of a laddered RC circuit.

18. The portable device of claim 16, wherein the circuit model further includes a second voltage source representing the ambient temperature.

19. The portable device of claim 16, wherein the circuit model further includes a ground terminal representing the ambient temperature at a fixed value.

20. The portable device of claim 16, wherein the surface temperature (Tsurf) is equal to Tsurf=ΔTsurf+Tamb, where Tamb is the ambient temperature and ΔTsurf is a temperature difference caused by heat transfer from an interior to a surface of the portable device.

* * * * *